Dec. 10, 1940.   L. G. KURTZ ET AL   2,224,789
REFUSE COLLECTING TRUCK
Filed Feb. 13, 1939   8 Sheets-Sheet 3

Inventors
Laron G. Kurtz,
Carl C. Ottoson,
By George H. Mitchell
Attorney

Dec. 10, 1940.  L. G. KURTZ ET AL  2,224,789
REFUSE COLLECTING TRUCK
Filed Feb. 13, 1939    8 Sheets-Sheet 4

Inventors
Loron G. Kurtz,
Carl C. Ottoson,
By George H. Mitchell
Attorney

Patented Dec. 10, 1940

2,224,789

UNITED STATES PATENT OFFICE 2,224,789

REFUSE COLLECTING TRUCK

Loron G. Kurtz, Brooklyn, and Carl C. Ottoson, Port Richmond, Staten Island, N. Y.

Application February 13, 1939, Serial No. 256,172

19 Claims. (Cl. 214—67)

This invention relates to improvements in a refuse collecting truck, of the type provided with a power driven endless conveyor for loading material into the truck. The truck body is pivoted for dumping, and the conveyor is provided with a downward and rearward extension which may be pivoted for upward movement during the dumping operation. The raising and lowering of the body, and the raising and lowering of the downward extension are preferably done by hydraulic means, which means, together with other features of the type of truck here involved, is more fully described in our application Serial No. 156,782, filed July 31, 1937.

The present invention is directed mainly to the following features, briefly expressed:

1. Improved hydraulic means for driving the conveyor.

2. The provision of an improved guard at the forward part of the conveyor, for preventing the accumulation by winding of rope, wire, rags and the like about the forward shaft of the conveyor.

3. The provision of an improved guideway for the conveyor.

These several features will now be described, in the order indicated above.

In our copending application referred to, the conveyor is driven mechanically, that is to say, through a power take-off, reducing gears, a clutch, drive shafts, etc. Power from the motor of the truck is carried to driving sprockets at the forward end of the conveyor for driving it.

In the present invention, the conveyor is driven by hydraulic means and such hydraulic drive represents an improvement over the mechanical drive just described, in that the reducing gears, drive shafts, clutches, universal joints, spline shafts, pillow bearings, etc., necessary for the mechanical drive, are entirely eliminated.

Another important feature of the hydraulic drive lies in the ease with which reversal of the drive is accomplished. This is effected readily by reversing the fluid flow by means of a reversing valve, and this reversal is of particular utility as, for example, where the conveyor may jam due to overload; such overload is usually due to a bundle of material too large for the conveyor to handle, and such a bundle may be broken up by one or two reversals of the conveyor.

With the mechanical drive, in order to effect a reversal, it is necessary to use a hand crank, or to provide complicated and expensive reversing gears; with the present invention the use of the hand crank or reversing gears is eliminated. The use of the hand crank is particularly difficult because the power from the hand crank is applied at the rear end of the worm shaft extension of the speed reducer, which is located at the upper part of the forward end of the truck body, requiring the operator to climb up on the side of the truck to use such hand crank.

Another valuable feature of the hydraulic drive is that in the event of an overload which might cause the conveyor to jam and parts to break, such breakage is prevented by providing a pressure operated relief or by-pass valve, set to open when the pressure exceeds a certain predetermined safe amount. In the case of a jam, the fluid is by-passed and thereby the continual application of power to the drive is avoided, which might result in breakage of some part of the mechanism.

Fluid under pressure is already available on the truck for operating the body hoist, although in the present preferred embodiment of the invention separate pumps are provided for supplying fluid under pressure for the body hoist and for the hydraulic drive of the present invention.

More specifically, the hydraulic drive involves a hydraulic motor of any desired type which is either coupled directly, or coupled through reducing gears, to the drive shaft carrying the drive sprockets at the forward end of the conveyor. A high speed, low torque motor may be used in connection with a speed reducer, or a low speed, high torque motor may be used, connected directly to the conveyor head shaft with suitable coupling means.

As more fully explained in our copending application Serial No. 156,782, previously referred to, the forward end of the conveyor is resiliently mounted, this resilient mounting comprising side plates against which bear suitable springs. The hydraulic motor of the present invention is preferably mounted directly on and carried by these side plates so as to move therewith.

While the positioning of the hydraulic motor just described is preferred, it should be understood that the hydraulic motor may be placed in other operative positions with respect to the conveyor such, for example, as by being placed to drive sprockets at the upper part of the downward and rearward extension.

Hydraulic motors, available for driving the conveyor, are of a type which is simple, sturdy and strong, giving long life with practically no possibility of breakdown. By selecting the desired type of hydraulic motor, the desired speed and the desired torque may be readily obtained.

As mentioned above, the motor may drive the driving shaft directly or it may drive a worm which, in turn, drives a worm wheel on the drive shaft that carries the sprockets which drive the conveyor, or it may drive any other gear type or sprocket and chain type speed reducer.

The improved guard for preventing the winding up of rope, wire, rags, etc. on the forward drive shaft, in its preferred embodiment, is a generally flat, wide member, one edge of which engages with the shaft, the guard extending rearwardly a distance greater than the distance between two flights of the conveyor. Such a guard is of great practical importance in the operation of the conveyor.

In application Serial No. 156,782, above referred to, sprockets are provided at the upper end of the downward extension, the conveyor passing around these sprockets for passing around the bend at this point. In the present improvement, these sprockets are eliminated, and curved guideways provided instead.

The general features of the invention having been thus outlined, further advantages of structure and operation will be described in connection with the appended drawings illustrating the present preferred embodiments of the invention.

Referring now to these drawings, in which similar reference characters indicate similar parts, 2 indicates the body of the refuse collecting truck, which is pivoted on the pivots 4 for rearward dumping, the raising and lowering of the body being controlled by a hydraulic cylinder 6. In the upper part of the truck body is an endless conveyor 8, which extends well into the forward part of the body, the conveyor passing about forward driving sprockets 10 carried by a driving shaft 12. The intermediate part of the conveyor passes around curved upper and lower guideways 14 and 16 at the upper rear part of the body and into the downward and rearward extension 16. This downward and rearward extension is pivotally mounted for raising and lowering, this operation being effected by the hydraulic or pressure operated cylinders 19. The lower end of the conveyor passes about sprockets or traction wheels 18, which are enclosed in a resilient loading boot 20 provided with a rigid loading shelf 22, this loading boot forming the subject matter of our previously filed application Serial No. 208,937, filed May 19, 1938, now Patent No. 2,194,475, granted March 26, 1940. The parts enumerated above are also more fully described in our application Serial No. 156,782.

Figure 3:
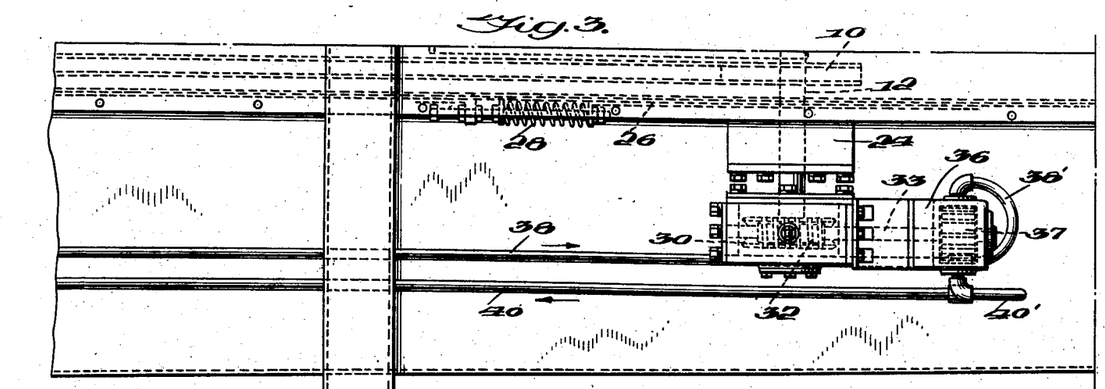
Figure 3 is a plan, on an enlarged scale, of one type of hydraulic drive for the conveyor, i. e. the high speed, low torque type.
Figure 4:
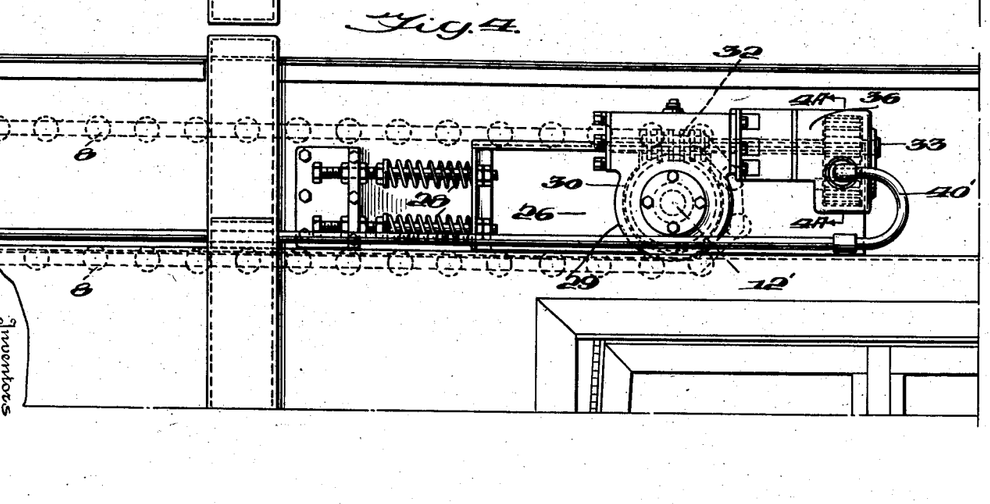
Figure 4 is a side view of the motor of Figure 3.

Coming now to the hydraulic drive, and referring particularly to Figures 3 and 4, the drive shaft 12 carrying the driving sprockets 10 for the conveyor is mounted in bearing blocks inside of housing 24. These housings and bearings are mounted on side plates 26, which are resiliently urged forwardly or to the right by springs 28, as described in more detail in our application Serial No. 156,782, aforesaid. The shaft 12 is flexibly coupled to a short shaft 12' extending into the worm gear housing 29. A worm wheel 30 is fixed on shaft 12'. The worm wheel 30 is driven by a worm 32, which in turn is on a shaft 33 driven by hydraulic motor 36. The hydraulic motor 36 is of the high speed, low torque type and comprises gears 37 and 37' driven by fluid under pressure from the lines 38 and 40, respectively connected to the motor 36 by flexible pipes 38' and 40', the flexibility of the pipes compensating for movement of the plates 26 on which the entire motor is mounted. The motor 36 is of standard and known construction. Any other suitable type of motor could be used here.

The motor 36 is of such construction that when fluid under pressure is applied through one of the pipes such as 38, the motor will run in one direction, while if applied through the other pipe, it will run in the opposite direction.

Figure 5:
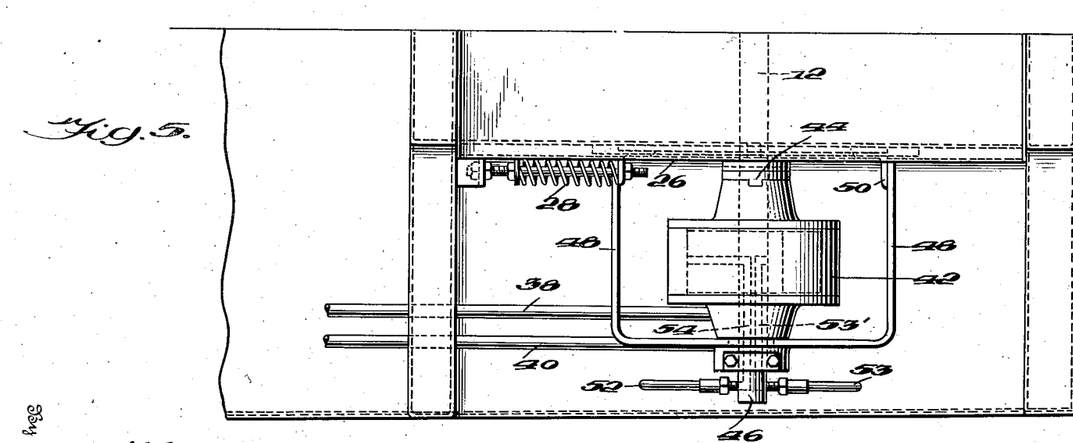
Figure 5 is a plan view, on an enlarged scale, of another type of hydraulic drive for the conveyor, i. e. the low speed, high torque type.
Figure 6:
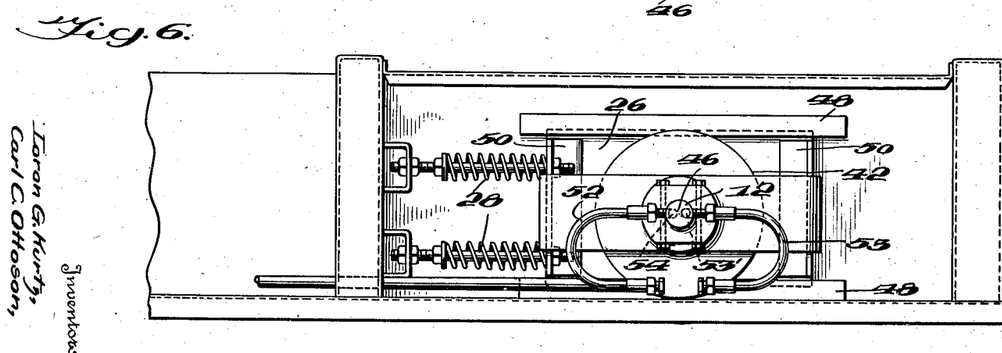
Figure 6 is a side view of the motor of Figure 5.

The low speed, high torque motor shown in Figures 5 and 6 will now be described. This motor is also of standard known construction and comprises a rotatable housing 42, which is connected by a flexible coupling 44 to the drive shaft 12 of the conveyor. The stator of the motor comprises a fixed shaft 46, supported by a substantially U-shaped wide mounting plate 48 secured by suitable brackets 50 to the side plates 26. This motor is of the rotor and vane type, fluid under pressure being led to and from the motor through pipes 52 and 53, depending upon in which direction the motor is desired to rotate. The stator shaft 46 is provided with drilled passages 52' and 53' respectively, in fluid communication with the pipes 52 and 53. Pipes 52 and 53 are connected to the pipes 38 and 40, one of which is a pressure pipe and the other of which is a return pipe, depending upon the position of the reversing valve, which will now be described.

The two types of hydraulic motor just described are of the type that reverse their direction of rotation with reversal of the fluid flow; in case the conveyor jams, such jam can usually be broken by one or two short reversals of the direction of travel of the conveyor. The pipes 38 and 40 leading to and from the hydraulic motor are connected to a reversing and by-pass overload valve indicated generally at 54, Figs. 7, 8 and 9. The valve comprises a central passageway indicated generally at 56, to which fluid under pressure is delivered from a pressure pipe 58. This passageway 56 may be put into selective communication with either pipe 38 or pipe 40, or may occupy a neutral position, in which latter case the fluid under pressure passes into an escape or exhaust passageway 60 and thence into a pipe 62 for return to the fluid reservoir, as will be described later.

Figure 7:
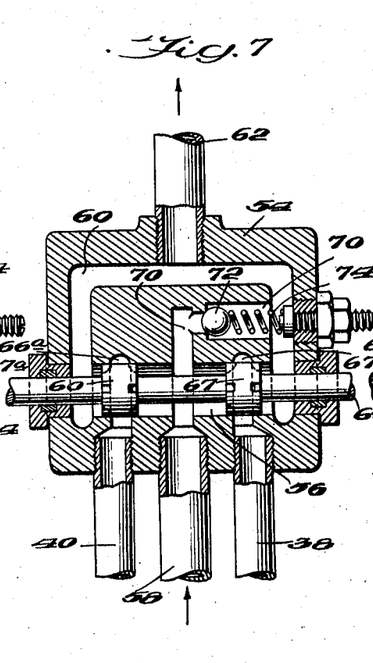
Figure 7 is a sectional view, on an enlarged scale, of the reversing valve for the hydraulic motor, in neutral position.
Figure 8:
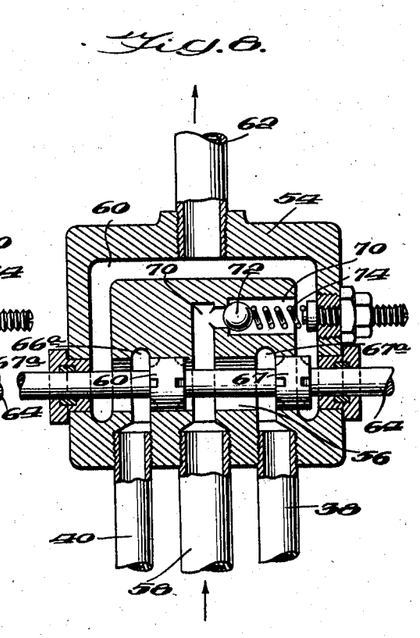
Figure 8 is a similar view, showing the valve in normal operating position.
Figure 9:
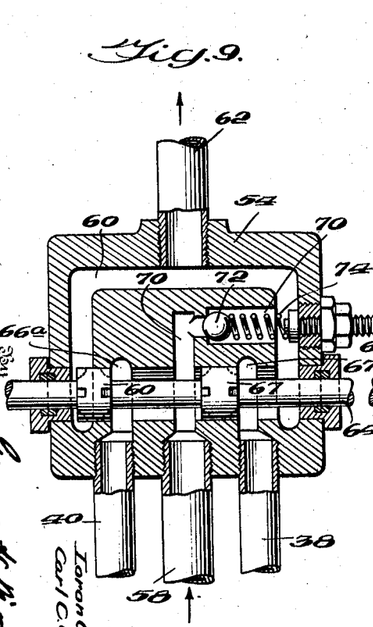
Figure 9 is a similar view, showing the valve in position for reversing the flow of fluid through the hydraulic motor.

The three types of fluid flow just described are effected by valve means comprising an actuating rod 64 provided with spaced piston-like heads 66 and 67. These heads are provided with cut-out portions 66' and 67', which are adapted to communicate respectively with recesses 66a or 67a in the valve body when the valve is in a particular position with respect to such recesses, as will be described.

When the parts are in the neutral position shown in Figure 7, fluid under pressure entering through the pipe 58 escapes through the passages 66', 66a and 67', 67a to the passage 60 and thence back to the fluid reservoir and neither motor will operate. When the valve rod 64 is in the position shown in Figure 8, the fluid under pressure passes to the pipe 38, operates one of the hydraulic motors (36 or 42, as the case may be) and returns through the pipe 40, into passageway 60 and pipe 62. Reversal of operation of the motors is effected by placing the heads 66 and 67 in the position shown in Figure 9, in which the fluid under pressure is supplied to the pipe 40, operates the motor and returns through the pipe 38 and thence into passage 60 and pipe 62.

Fluid under pressure is supplied to pipe 58 by pipes 58a, 58b, 58c, flexible to allow for pivotal movement of the truck, and 58d, 58d being connected to the pressure side of pump 58e. Fluid escapes from the valve 54 by pipes 62, 62a, 62b, 62c, flexible to allow for pivotal movement of the truck, and pipe 62d, thus returning to the fluid reservoir 62e. Fluid is supplied to the pump from the reservoir by pipe 62f, thus completing the circuit.

In order to relieve excess pressure in the case of overload or jamming, the valve is provided with a by-pass passage 70 in which is seated a one-way pressure operated valve 72 loaded by an adjustable spring 74. When the pressure in the valve exceeds a certain predetermined amount as determined by the spring 74 and valve 72, the pressure will be relieved by the unseating of the valve and the escape of fluid into the passageway 60.

The valve rod 64 may be actuated in any suitable manner, as by operative connection with a bell crank 64a, which is in turn operated by an operating rod 64b, in a position for convenient access by the operator.

Figure 1:
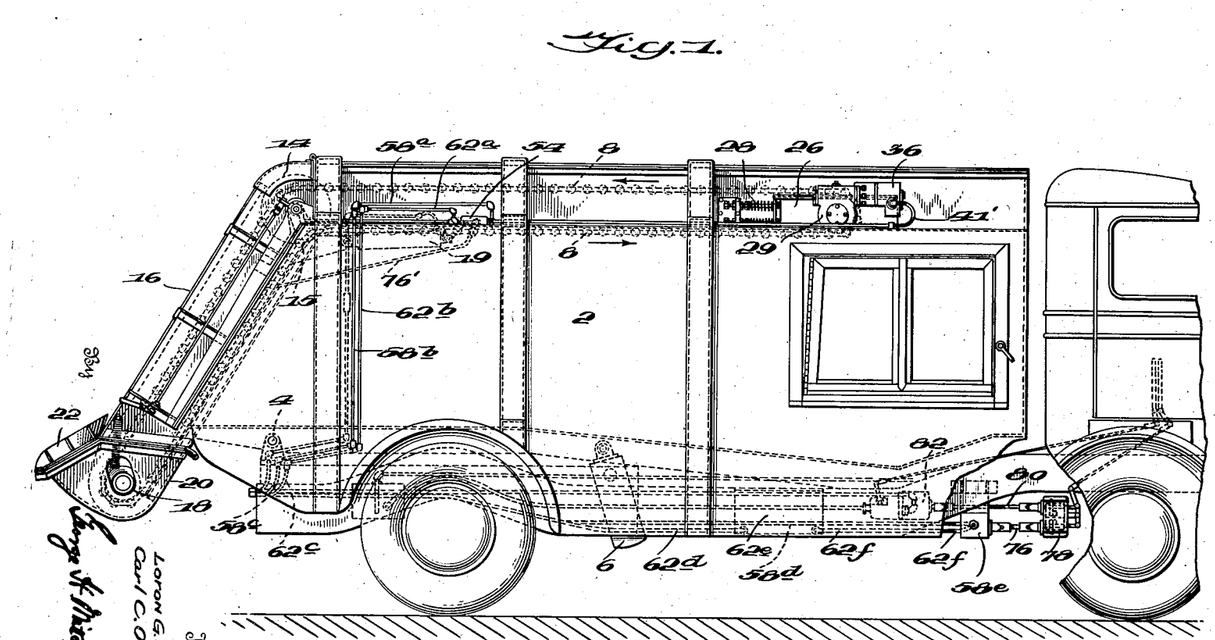
Figure 1 is a side view of a refuse collecting truck showing the several features of the present invention.
Figure 2:
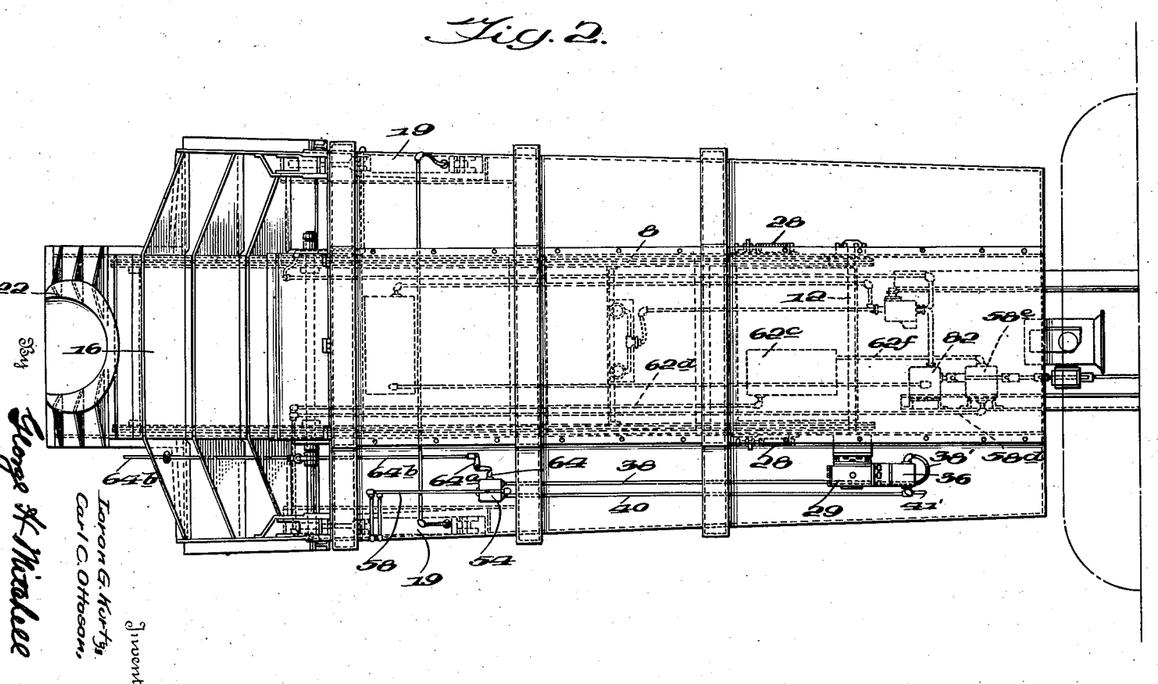
Figure 2 is a plan view of Figure 1.

The pump 58e is driven in any suitable manner, as by a connection 76, see Fig. 1, from a gear box 78, to which power is supplied from the motor of the truck. The gears may also drive a power connection 80, operatively connected to a pump 82 for supplying fluid under pressure for the body hoist and tail gate cylinders 6 and 19. The gears are arranged to drive 76 and 80 alternately, as evidently the hydraulic motors would not be driven during the raising and lowering of the truck body incident to dumping.

Figures 4A, 10, 11:
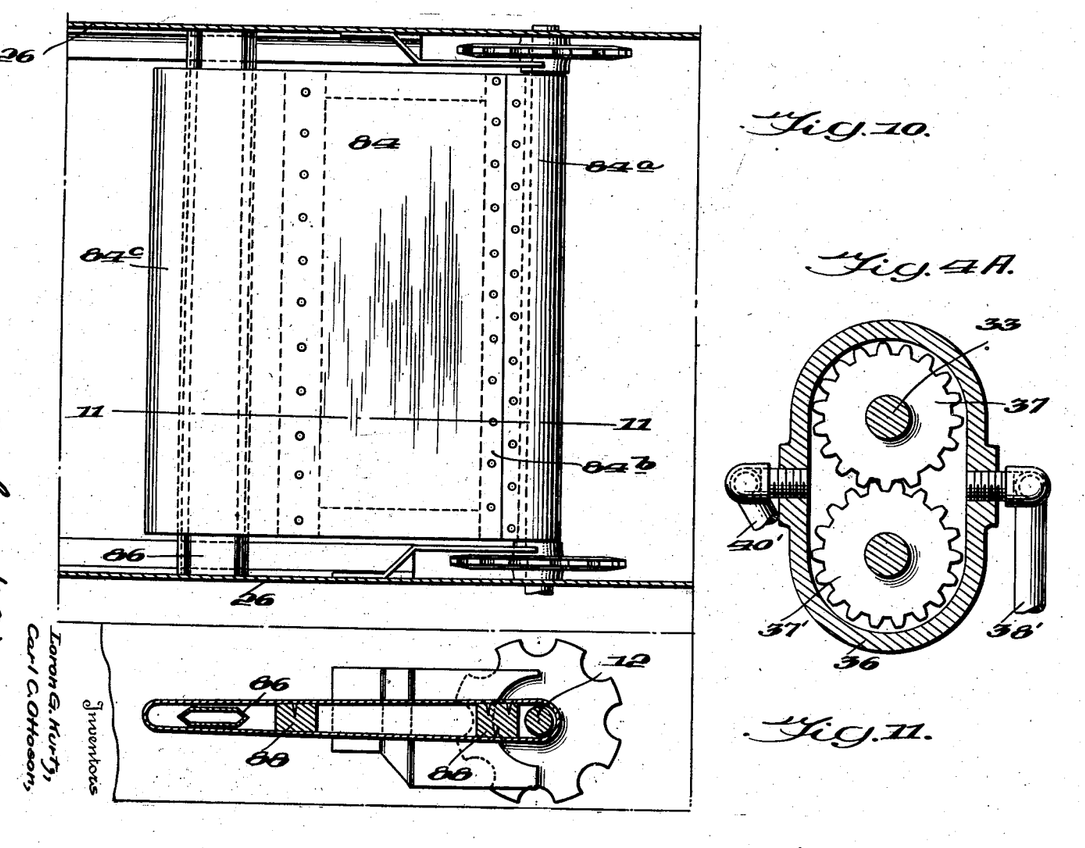
Figure 4A is a sectional view of the motor of Fig. 4, on line 4A—4A.
Figure 10 is a plan view, on an enlarged scale, of the guard for the forward shaft of the conveyor.
Figure 11 is a sectional view on the line 11—11 of Fig. 10.

The box-like guard, shown in Figures 10 and 11, for preventing rope, wire, rags, etc. from wrapping around the drive shaft 12 will now be described. This guard, indicated generally at 84, is placed at the forward end of the conveyor, extending substantially from the drive shaft 12 backwardly between the upper and lower reaches of the conveyor; the fore and aft dimension of the guard is a little greater than the distance between two flights of the conveyor. In the present preferred embodiment of the invention, this guard 84 is double-walled, the forward end extending around the drive shaft 12, being supported thereby, while the rear end is supported by a transversely extending support 86 which extends through the guard 84 between the upper and lower walls thereof; this support is secured to the side plates 26 by welding or the like. The guard 84 may be made in several sections such as 84a, 84b and 84c for convenience in assembling with relation to the shaft 12 and the transverse support 86. The upper and lower walls of the guard 84 may be braced apart by the filler strips 88.

Such a guard is of great practical importance because some types of refuse contain ropes, wire and rags which tend to wrap around the shaft 12, ultimately accumulating to such an extent as seriously to interfere with the operation of the conveyor. A guard of the type just described prevents this.

Figure 14:
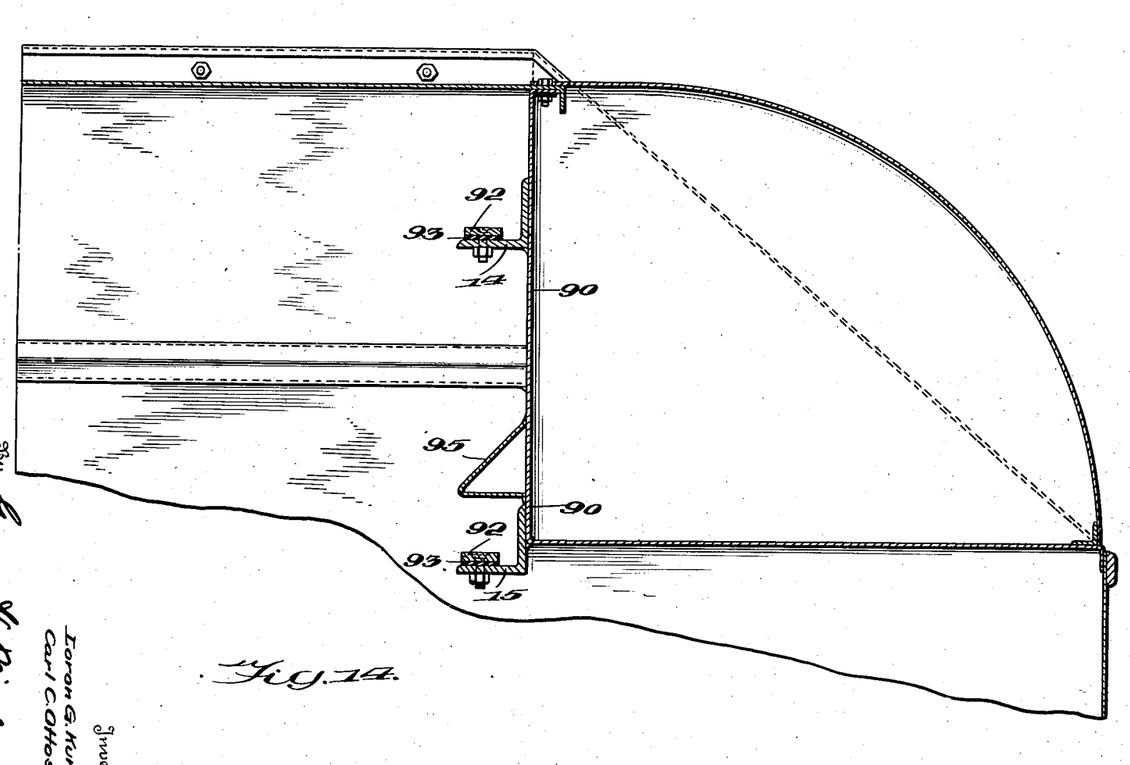
Figure 14 is a detail showing the channeled guideway for the conveyor.

As was mentioned in the earlier part of the specification, the conveyor passes through curved guideways 14 and 15 positioned at the upper rear part of the truck, instead of around sprockets. These guideways have been found to be more effective than the use of the sprockets described in our earlier application Serial No. 156,782. The upper guideway 14 is essentially a curved angle iron, braced or otherwise suitably secured to the side wall 90 of the conveyor housing, and provides an arcuate guide for the conveyor. A wear strip 92 is preferably provided on the upper surface of the guide 14, such wear strip being seated on a rubber strip 93, positioned between it and the guide 14. Another strip of rubber may, if desired, be placed on the upper surface of strip 92, particularly for eliminating noise.

The lower guideway 15 is a curved angle iron, and is also suitably secured to the side wall 90 and is provided with a wear strip 92 and supporting rubber strip 93. A housing 95 may be positioned above the lower guideway 15 for laterally deflecting grit and refuse that might tend to fall on the guideway and increase friction and wear at that point.

It will be understood that the guideways 14 and 15 and cooperating parts as just described are provided at the other side of the conveyor, not shown in Figure 14, for accommodating the side chains of the conveyor at such other side.

Figure 12:
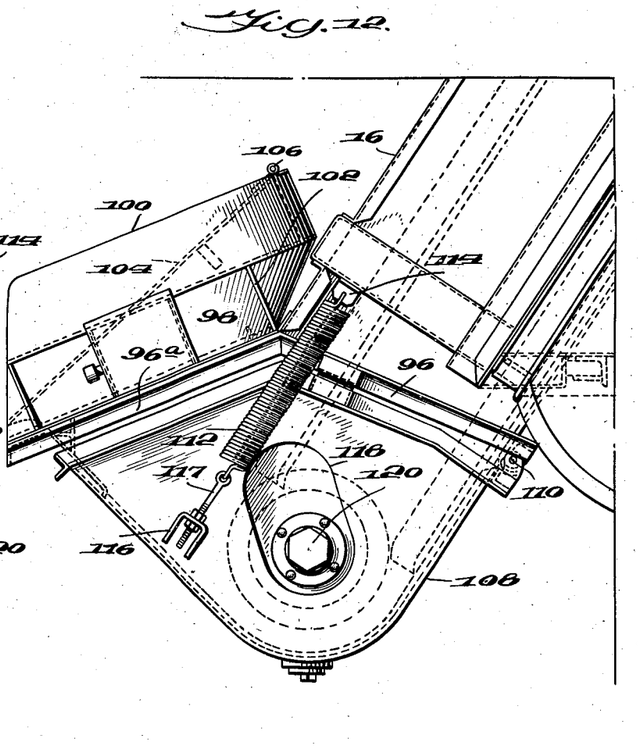
Figure 12 is a side view of the resiliently mounted boot.
Figure 13:
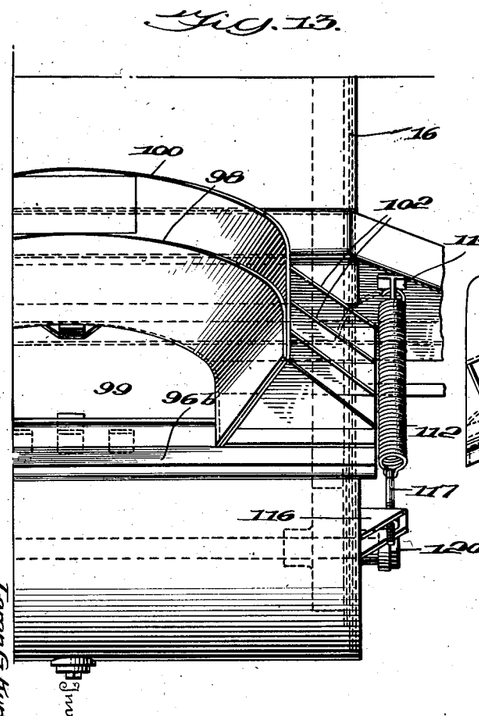
Figure 13 is a partial view of the boot of Figure 12, looking toward the right.

One type of resiliently mounted boot is shown in Figure 1. An improved form of resiliently mounted boot is shown in Figures 12 and 13. In this latter form, the lower end of the housing 16 of the conveyor has secured to it on each side angle irons 96, which extend laterally or to the left, as at 96a, to form rigid lateral supports which rigidly support a transversely extending loading shelf 96b. Members 96a and 96b support a loading funnel 98, the upper edge of which is bordered by a guide flange 100, for guiding refuse into the loading opening 99. Members 96 and 100 are rigidly braced by a plurality of webs 102. A cover 104 is provided for covering the funnel opening, this cover being hinged at 106. This cover prevents the escape of dust from the loading opening.

The loading boot proper indicated generally at 108 is hinged at its upper rear part on the pivot 110 to swing downwardly and outwardly, against the tension exerted by a tension spring 112, the upper end of which is secured as at 114 to the lower part of the conveyor housing, while the other end is connected to the boot 108 by a stirrup 116 and adjustable threaded connection 117. A similar spring is, of course, provided on the other side, these springs allowing the boot to swing about its pivot in case a large mass of refuse is put into the funnel. The boot is provided with slots 118 for allowing relative movement of the boot with relation to the fixed lower bearing 120 of the shaft (not shown) which supports the sprockets or traction wheels at the lower end of the conveyor.

With the improved hydraulic drive of the present invention, high speed, low torque or low speed, high torque operation may readily be obtained by appropriate selection of a suitable type of hydraulic motor. Motors of this type are very durable and very reliable in operation. They may be readily reversed by a simple reversing valve. In the case of a jam, where the conveyor is stopped, and fluid under pressure is still applied to the motor, there will be no breakage because such pressure will be relieved by the by-pass overload valve already described. The provision of a hydraulic motor eliminates the use of a clutch connection between the chassis and body of the truck, which clutch is necessary in the case of a mechanical drive. It also eliminates the necessity of reversing gears, pillow bearings and transmission shafts required in a mechanical drive.

Operation of the truck is also considerably improved by the provision of the box-like guard for preventing ropes and wire from wrapping around the forward end of the drive shaft. The elimination of the sprockets and the use of curved guideways at the bend in the conveyor provide a simple and sturdy construction, while the improved resilient loading boot, supported by tension springs and having a rigid loading shelf, a loading funnel and a hinged cover for the loading opening, are useful in facilitating ease of loading of the lower end of the conveyor and prevent escape of dust from the loading opening.

While the present preferred embodiments of the invention have been illustrated in considerable detail, it should be understood that the invention is not to be limited to these precise details, but may be carried out in other ways.

We claim as our invention:

1. In an automotive truck of the character described, in combination, a truck body, a power driven endless conveyor carried by the truck body at the upper part thereof, and provided with a downward extension, movable means for resiliently mounting the forward end of the conveyor, and a hydraulic motor mounted on said movable means and movable therewith, for driving said conveyor.

2. In an automotive truck of the character described, in combination, a truck body pivoted for dumping, a power driven endless conveyor carried by the truck body, movably mounted resilient means including side plates for mounting one end of the conveyor, and a hydraulic motor for driving the conveyor, carried by said side plates and movable therewith.

3. In an automotive truck of the character described, a chassis, a body pivoted on said chassis for dumping, a power driven endless conveyor carried by said body, and provided with a downward extension, hydraulic means mounted on the body for driving said conveyor, a pump on the chassis for furnishing fluid under pressure for said hydraulic means, and pipes for connecting the pump and the hydraulic means, said pipes passing from the chassis to the pivoted body adjacent the axis about which the body pivots.

4. In an automotive truck of the character described, a chassis, a body pivoted on said chassis for dumping, a power driven endless conveyor carried by said body, and provided with a downward extension, hydraulic means for driving said conveyor, a pump on the chassis for furnishing fluid under pressure for said hydraulic means, pipes for connecting the pump and the hydraulic means, said pipes passing from the chassis to the pivoted body adjacent the axis about which the body pivots, and means for reversing the fluid flow to said hydraulic means for reversing its direction of movement.

5. In an automotive truck of the character described, a chassis, a body pivoted on said chassis for dumping, a power driven endless conveyor carried by said body, and provided with a downward rear extension, hydraulic means for driving said conveyor, a pump on the chassis for furnishing fluid under pressure for said hydraulic means, pipes for connecting the pump and the hydraulic means, said pipes passing from the chassis to the pivoted body adjacent the axis about which the body pivots, and a reversing valve on the body for reversing the fluid flow to said hydraulic means for driving the same in the reverse direction.

6. In an automotive truck of the character described, a truck body, a power driven endless conveyor carried by the truck body, for loading material into the upper part thereof, a drive shaft for said conveyor at one end thereof, and partition means positioned at said end of the conveyor, and extending between the upper and lower reaches thereof for a substantial distance, for preventing rope, wire and the like from winding around said drive shaft.

7. In an automotive truck of the character described, a truck body, a power driven endless conveyor carried by the truck body, for loading material into the upper part thereof, a drive shaft for said conveyor at one end thereof, and partition means positioned at said end of the conveyor, and extending between the upper and lower reaches thereof for a substantial distance, for preventing rope, wire and the like from winding around said drive shaft, said partition including a portion extending around said drive shaft.

8. In an automotive truck of the character described, a truck body, a power driven endless conveyor carried by the truck body, for loading material into the upper part thereof, a drive shaft for said conveyor at one end thereof, and a guard at least as wide as the distance between two flights of the conveyor, positioned at the drive end of the conveyor, between the upper and lower reaches thereof, for preventing rope, wire and the like from winding around said drive shaft.

9. In an automotive truck of the character described, a truck body, a power driven endless conveyor carried by the truck body for loading material into the upper part thereof, a drive shaft for the conveyor at the forward end thereof, hydraulic means for driving said drive shaft, and a guard positioned between the upper and lower reaches of the conveyor, and extending backwardly a substantial distance from the drive shaft and nearly as wide as the conveyor, for preventing rope, wire, rags and the like from winding around the drive shaft.

10. In an automotive truck of the character described, a truck body, a power driven endless conveyor carried by the truck body for loading material into the upper part thereof, a drive shaft at the forward end of the conveyor, movable means for resiliently mounting said drive shaft, and a guard, supported by said movable means and movable therewith, positioned between the upper and lower reaches of the conveyor and extending backwardly a substantial distance, for preventing rope, wire, rags and the like from winding around the drive shaft.

11. In an automotive truck of the character described, a truck body, a power driven endless conveyor carried by the truck body for loading material into the upper part thereof, a drive shaft at the forward end of the conveyor, movable means for resiliently mounting said drive shaft, and a guard, supported by said movable means and movable therewith, positioned between the upper and lower reaches of the conveyor, having a portion extending around the drive shaft, and extending backwardly a substantial distance, for preventing rope, wire, rags and the like from winding around the drive shaft.

12. In an automotive truck of the character described, a truck body, a power driven endless conveyor carried by the truck body for loading material into the upper part thereof, a drive shaft at the forward end of the conveyor, movable means for resiliently mounting said drive shaft, a hydraulic motor for driving said drive shaft, carried by said movable means and movable therewith, and a guard, supported by said movable means and movable therewith, positioned between the upper and lower reaches of the conveyor and extending backwardly a substantial distance, for preventing rope, wire, rags and the like from winding around the drive shaft.

13. In an automotive truck of the character described, a truck body pivoted for dumping, an endless conveyor, carried by the upper part of the truck body and provided with a downward extension, means for driving the conveyor at its forward end, and curved guideways for the conveyor, provided with replaceable wear strips, where the upper part of the conveyor bends downwardly to form said downward and rearward extension.

14. A refuse collecting truck, comprising in combination a truck body for holding the collected refuse and pivoted for dumping, an endless conveyor for loading the refuse into said body, carried by the upper part of the truck body and having a downward extension, a hydraulic motor on the truck body for driving the conveyor, fluid pressure generating means on the chassis of the truck, and pipe means for continuously connecting the said pressure generating means with the hydraulic motor.

15. A refuse collecting truck, comprising in combination a truck body for holding the collected refuse and pivoted for dumping, an endless conveyor for loading the refuse into said body, carried by the upper part of the truck body and having a downward extension, a hydraulic motor on the truck body for driving the conveyor, fluid pressure generating means on the chassis of the truck, pipe means for continuously connecting the said pressure generating means with the hydraulic motor, and valve means for controlling the application of the fluid pressure to the hydraulic motor.

16. A refuse collecting truck, comprising in combination a truck body for holding the collected refuse and pivoted for dumping, an endless conveyor for loading the refuse into said body, carried by the upper part of the truck body and having a downward extension, a hydraulic motor on the truck body for driving the conveyor, fluid pressure generating means on the chassis of the truck, pipe means for continuously connecting the said pressure generating means with the hydraulic motor, and means, including a reversing valve, for supplying fluid to the hydraulic motor for forward or reverse operation.

17. A refuse collecting truck, comprising in combination a truck body for holding the collected refuse and pivoted for dumping, an endless conveyor for loading the refuse into said body, carried by the upper part of the truck body and having a downward extension, a hydraulic motor on the truck body for driving the conveyor, fluid pressure generating means on the chassis of the truck, pipe means for continuously connecting the said pressure generating means with the hydraulic motor, and valve means, including a by-pass overload valve, for controlling the application of the fluid pressure to the hydraulic motor.

18. A refuse collecting truck, comprising in combination a truck body for holding the collected refuse and pivoted for dumping, an endless conveyor for loading the refuse into said body, carried by the upper part of the truck body and having a downward extension, a hydraulic motor on the truck body for driving the conveyor, fluid pressure generating means on the chassis of the truck, pipe means for continuously connecting the said pressure generating means with the hydraulic motor, means, including a reversing valve, for supplying fluid to the hydraulic motor for forward or reverse operation, and a by-pass overload valve cooperating with said pipe means, for relieving excess pressure therein in the case of an overload.

19. A refuse collecting truck, comprising in combination, a truck body for holding the collected refuse and pivoted for dumping, an endless conveyor for loading the refuse into said body, carried by the upper part of the truck body and having a downward extension, a motor on the truck body for driving the conveyor, power generating means on the chassis of the truck, and power transmitting means for continuously connecting the said power generating means with said motor.

LORON G. KURTZ.
CARL C. OTTOSON.